United States Patent Office 2,814,857
Patented Dec. 3, 1957

2,814,857
CERAMIC FUEL ELEMENT MATERIAL FOR A NEUTRONIC REACTOR AND METHOD OF FABRICATING SAME

Winston H. Duckworth, Columbus, Ohio, assignor to the United States of America as represented by the United States Atomic Energy Commission No Drawing. Application June 16, 1953,
Serial No. 362,128
9 Claims. (Cl. 29—182.5)

The present invention relates to ceramic bodies and in particular to ceramic bodies characterized by improved strength and density.

The present invention is concerned with the composition of ceramic bodies or materials containing silicon carbide, silicon, uranium and molybdenum, and a method for their fabrication.

Silicon carbide ceramic materials have long been used in structural applications which require a material having stability at high temperatures and good conductivity for thermal energies. Among the uses for such compounds have been furnace linings, jet engine parts, etc.

An additional utility for silicon carbide bodies which has recently developed is the employment of these bodies as structural materials in nuclear reactors, particularly those nuclear reactors designed as power plants for ships and aircraft propulsion. The requirements for structural materials for use in nuclear reactors are very rigid. There is very large heat dissipation in a very small volume so that the structural material must be extremely stable, have good creep resistance and thermal conductivity at high temperatures and have good strength. In addition, the material in the reactor must have a low capture cross section for neutrons in an energy range in which the reactor is designed to operate. On this basis silicon carbide is well fitted for use in nuclear reactor construction since silicon has a cross section for the absorption of thermal neutrons of only 0.1 barn and carbon has a cross section for capture of thermal neutrons of 0.004 barn.

Silicon carbide bodies containing uranium may be used as fuel elements in nuclear reactors, both of the plutonium production type and the reactors primarily designed for power production.

It is an object of the present invention to provide silicon carbide ceramic materials characterized by improved structural properties and particularly with regard to strength.

A further object is to provide a process for fabricating said products.

Still other objects of the present invention will be apparent from the description of the invention which follows.

It has been discovered in accordance with the present invention that the incorporation of a minor amount of molybdenum into silicon carbide ceramic bodies significantly increases the strength of the resultant body. This significant increase in strength is apparent not only in bodies comprised of silicon carbide and silicon but also in bodies comprised of silicon carbide, silicon and uranium. It has furthermore been found that the incorporation of uranium into silicon carbide-silicon bodies will substantially increase the strength of said bodies. Increases in the compressive strengths of silicon carbide-silicon bodies of as much as approximately 800% were obtained by the incorporation of 30% of uranium under proper conditions. The addition of 1% of molybdenum to silicon carbide-silicon-uranium bodies may raise the strength, as measured by the modulus of rupture, by as much as 50%.

Ordinarily the increase of strength obtained by the addition of molybdenum and/or uranium to silicon carbide ceramic bodies is also accompanied by a decrease in porosity and an increase in density.

The ceramic bodies in general were prepared by plastic extrusion, casting or pressing. The bodies were then sintered at a temperature of the order of 2700° F. in an atmosphere of nitrogen, argon, or mixtures thereof. In some cases the bodies were then aged in either a dry or a room atmosphere for a period of about 28 days. Between 0 and 30% of uranium, as the oxide, was added to silicon carbide compositions containing silicon carbide and between 0 and 30% silicon. The silicon carbide compacts containing 10–30 wt. percent silicon and 10–30 wt. percent uranium were found to be particularly strong. In general, the degree of strength development in the specimens of silicon carbide-silicon increased progressively with increases in the uranium content over the range of 0–30% uranium when the bodies were sintered in nitrogen at elevated temperatures. When the compacts were sintered in argon, however, a strength increase with the addition of uranium was only noticed over a 0–10% uranium content range. Uranium-bearing structures sintered in nitrogen were markedly stronger than those of the corresponding compositions which were sintered in either argon or a mixed nitrogen-argon atmosphere. A nitrogen sintering atmosphere is believed to result in the formation of nitride in the ceramic body and a chemical analysis of such silicon carbide-silicon-10–30% uranium uniformly showed a total nitrogen content of approximately 3% by weight. Since nitrogen has a significantly higher thermal neutron absorption cross section than the other components, it may be necessary to compromise between nitrogen content and strength in silicon carbide bodies which are to be used as nuclear reactor components. Sintering of the bodies in a nitrogenous atmosphere, preferably consisting of ⅓ nitrogen and ⅔ argon, results in bodies of nearly equal strength to those sintered in 100% nitrogen and the bodies have a nitrogen content of only 1½ to 2% by weight.

The strength and soundness of silicon carbide-silicon-uranium bodies was found to be somewhat greater in the bodies in which the uranium was incorporated as $UO_2$, than in the bodies in which the uranium was incorporated as $U_3O_8$, but the difference was not great. Variations in sintering temperature between 2650 and 3050° F. showed no change in resultant characteristics. The specimens which were formed, however, by plastic extrusion or by dust-pressing were found to be considerably stronger than those formed by slip-casting.

The increase in strength of the silicon carbide-silicon bodies by the addition of uranium is shown by the following table.

| Composition | | | Compressive Strength |
|---|---|---|---|
| SiC, wt. percent | Si, wt. percent | U*, wt. percent | |
| 100 | 0 | 0 | 600 |
| 90 | 10 | 0 | 5,000 |
| 80 | 20 | 0 | 8,000 |
| 70 | 30 | 0 | 12,600 |
| 90 | 0 | 10 | 1,600 |
| 81 | 9 | 10 | 8,200 |
| 72 | 18 | 10 | 14,000 |
| 63 | 27 | 10 | 21,000 |
| 80 | 0 | 20 | 4,000 |
| 72 | 8 | 20 | 10,000 |
| 64 | 16 | 20 | 17,000 |
| 56 | 24 | 20 | 23,000 |
| 70 | 0 | 30 | 5,000 |
| 63 | 7 | 30 | 11,000 |
| 56 | 14 | 30 | 18,000 |
| 49 | 21 | 30 | 25,000 |

*U added as $UO_2$.

The specimens were tested for compressive strength by crushing uniform samples in a hydraulic testing machine. The strength was recorded as compressive stress at failure. The powdered compacts were prepared in the usual manner by thoroughly mixing components, then dust-pressing the mixture to produce compacts and finally sintering the compacts for three hours at 2650° F. in a nitrogen atmosphere.

Addition of a small percentage of molybdenum to silicon carbide-silicon bodies containing between 0 and 30% uranium results in a substantial strength increase even in the bodies which contain the maximum amount of uranium. Only a very small amount of molybdenum, between 0.5 and 2%, is required to substantially increase the strength of the ceramic bodies and 1% has been found to give preferable results. The extent to which molybdenum strengthens ceramic materials composed of silicon carbide, silicon and uranium is shown by the improved values in terms of moduli of rupture at room temperature shown by the following table on molybdenum-containing specimens.

| Base Composition, percent | | | Mo Added, percent | Modulus of Rupture, p. s. i. | | |
|---|---|---|---|---|---|---|
| SiC | Si | U* | | As Sintered | After 28 Days in Dry Atmosphere | After 28 Days in Room Atmosphere |
| 40 | 30 | 30 | 0 | 5,800 | 7,200 | 7,400 |
| 40 | 30 | 30 | 1 | 9,000 | 9,500 | 9,300 |
| 40 | 30 | 30 | 5 | 7,400 | 7,400 | 7,000 |
| 40 | 30 | 30 | 10 | 5,000 | 5,900 | 5,200 |

*U added as $UO_2$.

From the foregoing data it is also apparent that the strength of the specimens increases on aging and it is particularly notable in those containing the added 1% of molybdenum. The modulus of rupture was calculated in the usual manner for rigid ceramic bodies, as the maximum fiber stress at failure.

The ceramic bodies were fabricated from materials of the following description. The silicon carbide, nominally minus 320 mesh in size, consisted of a mixture of hexagonal and cubic forms of this compound. The only impurity was quartz. The silicon metal was 97% pure, was designated as minus 200 mesh in size, and contained some iron and aluminum as the principal impurities. The molybdenum incorporated therein was high-purity grade, minus 200 mesh in size. The uranium incorporated in these specimens was usually added in the form of an oxide of uranium and preferably as the dioxide, since the compressive strength of specimens wherein uranium was incorporated in the form of dioxide exceeded by about 2000 p. s. i. the strength of specimens wherein uranium was incorporated in the form of $U_3O_8$. In testing these specimens, the compressive strength was determined by crushing the specimens in a hydraulic testing machine and strength was recorded as compressive stress at failure.

The powdered raw materials for each ceramic composition were blended throughly in the dry condition with a laboratory size muller-type mixer prior to the addition of a binder or plasticizer. The ceramic materials were prepared for dust-pressing by adding 3% phenol-formaldehyde resin in an alcohol solution and the binder was dispersed by blending in mixer with added 7% of ethyl alcohol which was subsequently evaporated by air drying.

Ceramic mixtures were prepared for plastic extrusion by adding to the thoroughly mixed silicon carbide, silicon, uranium and molybdenum mixture 25% of an alcohol solution of the phenol-formaldehyde resin which contained 50% of ethyl alcohol, 19.2% wax emulsion, and 3% of silicone lubricant, followed by one hour of blending in a kneading-type mixer.

Cylinders or bars were formed by dust-pressing at a pressure of 10,000 p. s. i. in a steel die and were thereafter heated for one hour at 450° F. to cure the binder. Extruded bars were formed with a piston-type extrusion apparatus and a steel-forming orifice, and the extruded specimen was then heated for one hour at 450° F. to cure the binder. After the forming operation, the specimens were sintered in an inert atmosphere. Those specimens containing 10–30% uranium and sintered in nitrogen were stronger, but contained on an average of 3% nitrogen in the final product. Since this latter element has a large cross section for capture of thermal neutrons, a low nitrogen content in the final product is desirable in those ceramic materials employed in nuclear reactors. The nitrogen content was reduced to about 1½ to 2% by weight by sintering at about 2650° F. specimens containing from 10–30% each of uranium and silicon in a gas-fired furnace in which the atmosphere was about ⅓ by volume nitrogen and ⅔ by volume argon.

Sintering was preferably and usually effected in a muffle-tube furnace at temperatures ranging from 2650 to 3050° F. (about 1400–1700° C.) for three hours. Six hours were required for the specimens to attain the sintering temperature and 15 hours were required for cooling. In the muffle-tube furnace all specimens were separated from the supporting alundum slab by a layer of silicon carbide grain.

The sintered specimens were tested for strength and porosity by the following means. The strength in terms of the modulus of rupture was determined at room temperature. Specimens nominally measuring 5/16" x 5/16 x 3" were supported on a 2-inch span. A mechanical testing machine was used to apply a concentrated load at midspan to effect rupture. The modulus of rupture was calculated as the maximum fiber stress at failure in the usual manner for rigid ceramic bodies. The porosity of the specimens was determined by the conventional liquid-absorption and liquid-displacement techniques employing xylene as the liquid to determine the apparent percentage of voids.

The bulk density of the ceramic bodies was determined as the net weight per unit of gross volume determined by the liquid-displacement procedure. Three to four specimens were used in each test.

| Composition, percent | | | | Method of Forming | Apparent Porosity, percent | Bulk Density, g./cc. | Modulus of Rupture, p. s. i. |
|---|---|---|---|---|---|---|---|
| SiC | Si | U* | Mo | | | | |
| 80 | 10 | 10 | -- | Dust pressing | 42.4 | 2.05 | 2,500 |
| 80 | 10 | 10 | -- | Plastic extrusion | 44.9 | 1.81 | 2,700 |
| 80 | 10 | 10 | -- | Slip casting | 53.9 | 1.65 | 400 |
| 60 | 30 | 10 | -- | Dust pressing | 38.1 | 2.09 | 4,400 |
| 60 | 10 | 30 | -- | do | 38.7 | 2.53 | 3,100 |
| 40 | 30 | 30 | -- | do | 32.9 | 2.68 | 5,800 |
| 40 | 30 | 30 | -- | Plastic extrusion | 37.5 | 2.48 | 8,600 |
| 40 | 30 | 30 | -- | Slip casting | 48.0 | 2.04 | 3,300 |
| 40 | 30 | 30 | 1 | Dust pressing | 32.8 | 2.71 | 9,000 |
| 40 | 30 | 30 | 5 | do | 37.7 | 2.60 | 7,400 |
| 40 | 30 | 30 | 10 | do | 36.1 | 2.71 | 5,000 |

*U added as $UO_2$.

The foregoing are the preferred embodiments of this invention and it is to be understood that many alterations may be made without departing from the spirit of this invention as set forth in the foregoing specification and in the following claims.

What is claimed is:

1. A method of fabricating silicon carbide ceramic bodies of high compressive strength which comprises forming a mixture of 10–30 weight percent uranium in the form of a uranium oxide powder, 10–30 weight percent silicon metal powder, 1 weight percent molybdenum powder, and the balance silicon carbide powder, then compacting said mixture to form a body, and sintering said body in a nitrogenous atmosphere at a temperature of 2650–3050° F.

2. The process of claim 1 wherein the mixture is compacted by dust-pressing.

3. The process of claim 1 wherein the mixture is compacted by plastic extrusion.

4. The process of claim 1 wherein the sintering atmosphere is nitrogen.

5. The process of claim 1 wherein the sintering atmosphere is a mixture of nitrogen and argon.

6. The process of claim 1 wherein the uranium oxide is $UO_2$.

7. The process of claim 1 wherein the uranium oxide is $U_3O_8$.

8. A silicon carbide ceramic body formed by sintering at 2650–3050° F. a mixture 39 weight percent of silicon carbide, 30 weight percent silicon, 30 weight percent uranium as an oxide and 1 weight percent molybdenum.

9. A silicon carbide ceramic body formed by mixing 10–30 weight percent of silicon, 10–30 weight percent of uranium as a uranium oxide, 0.5–2.0 weight percent molybdenum, and the balance silicon carbide, and sintering at 2650–3050° F.

References Cited in the file of this patent

UNITED STATES PATENTS 2,422,215   Amberg et al. _____ June 17, 1947